United States Patent [19]

Blizzard et al.

[11] Patent Number: 4,537,829

[45] Date of Patent: Aug. 27, 1985

[54] CURABLE SILICONE COMPOSITIONS COMPRISING RESINS

[75] Inventors: John D. Blizzard, Bay City; Terence J. Swihart, Essexville, both of Mich.

[73] Assignee: Dow Corning Corporation, Midland, Mich.

[21] Appl. No.: 652,936

[22] Filed: Sep. 20, 1984

[51] Int. Cl.$^3$ .............................................. B32B 9/00
[52] U.S. Cl. ..................................... 428/429; 528/15; 528/19; 528/31; 528/32; 525/477; 525/478; 524/783; 524/786; 524/789; 524/861; 524/862; 524/765; 428/447
[58] Field of Search ....................... 528/15, 19, 31, 32; 525/477, 478; 524/783, 786, 789, 861, 862, 765; 428/429, 447

[56] References Cited

U.S. PATENT DOCUMENTS 4,310,678  1/1982  Blizzard et al. ........................ 528/31
4,322,518  3/1982  Blizzard ................................ 528/18

Primary Examiner—Melvyn I. Marquis
Attorney, Agent, or Firm—Andrew H. Ward

[57] ABSTRACT

Silicone compositions are disclosed which comprise a liquid silicone resin, a vinyl-containing silicone resin, a siloxane polymer, and a hydrosilylation catalyst. The compositions cure to give unusually strong, fuel resistant coatings and elastomers.

48 Claims, No Drawings

CURABLE SILICONE COMPOSITIONS COMPRISING RESINS

BACKGROUND OF THE INVENTION

This invention deals with curable silicone compositions containing certain silicone resins.

Silicone compositions in general are known for their excellent resistance to environmental stresses, such as low and high temperatures, ultraviolet radiation, and other environmental stresses. Among many such silicone compositions is that disclosed in U.S. Pat. No. 4,322,518, issued Mar. 30, 1982 to John Blizzard, and assigned to the assignee of the present invention. U.S. Pat. No. 4,322,518, discloses a curable silicone composition comprising:

(I) a certain liquid silicone resin; and
(II) a polydiorganosiloxane.

While the curable compositions disclosed in U.S. Pat. No. 4,322,518 represented a significant advance in the art, there remained room for improvement in some of the properties of the cured material. Specifically, there remained room for improvement in the physical strength and the fuel resistance of the cured composition, and in the corrosion protection furnished by the cured composition to a metal substrate coated with that composition.

For the sake of simplicity, the term Me is to be taken as the $-CH_3$ radical, and the term Vi is to be taken as the $-CH=CH_2$ radical throughout the following specification.

SUMMARY OF THE INVENTION

It is an object of the present invention to provide a silicone composition that can be cured to obtain a physically strong coating or film. It is a further object that said coating or film be resistant to diminution of physical strength upon exposure to fuels and resistant to diminution of adhesion to substrates upon exposure to fuels. It is a further object to provide coatings that furnish a high degree of corrosion protection to metal substrates.

These objects and others are accomplished by the compositions of the present invention and their cured products. The present invention comprises:

(A) a certain liquid organosilicon resin;
(B) an organosilicon polymer;
(C) an organosilicon resin consisting essentially of $Me_2ViSiO_{\frac{1}{2}}$ units, $Me_3SiO_{\frac{1}{2}}$ units and $SiO_{4/2}$ units; and
(D) a hydrosilylation catalyst.

DETAILED DESCRIPTION

The present invention relates to a composition comprising in combination, (A) from 1 to 200 parts by weight of the reaction product of (i) an organosilicon resin consisting essentially of $R_3SiO_{\frac{1}{2}}$ units and $SiO_{4/2}$ units wherein R represents a monovalent hydrocarbon radical and the ratio of $R_3SiO_{\frac{1}{2}}$ units to $SiO_{4/2}$ units is from 0.6/1 to 0.9/1 and
(ii) a polyorganohydrogensiloxane;

(B) 100 parts by weight of an organosilicon polymer having the formula $R''R'SiO(R_2'SiO)_xSiR_2'R''$, wherein R' is selected from the group consisting of monovalent hydrocarbon radicals, each R'' is selected from the group consisting of OH radicals and R' radicals, x has a value of from 0 to 5000, there being an average at least two radicals of said organosilicon polymer selected from the group consisting of vinyl radicals and hydroxyl radicals;

(C) from 1 to 50 parts by weight of an organosilicon resin consisting essentially of $(CH_3)_2(CH_2=CH)SiO_{\frac{1}{2}}$ units, $(CH_3)_3SiO_{\frac{1}{2}}$ units and $SiO_{4/2}$ units, said units being in a ratio of $(CH_3)_2(CH_2=CH)SiO_{\frac{1}{2}}$ units to $(CH_3)_3SiO_{\frac{1}{2}}$ units to $SiO_{4/2}$ units of from 0.10/0.6/1 to 0.25/0.9/1; and (D) from 0.00003 to 0.035 parts by weight of a hydrosilylation catalyst, said parts being by weight of the metal in the catalyst.

Component (A) of the composition of the present invention is the reaction product of: (i) an organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ units is from 0.6/1 to 0.9/1; and (ii) a polyorganohydrogensiloxane.

Component (A) of the present invention is disclosed in U.S. Pat. No. 4,310,678, issued Jan. 12, 1982 to Blizzard and Swihart and assigned to the assignee of the present invention. The specification of U.S. Pat. No. 4,310,678 is hereby incorporated into the present specification by reference to describe Component (A) of the present invention and to teach methods of synthesizing said Component (A).

Briefly stated, component (A) can be synthesized by reacting together:

(i) an organosilicon resin consisting essentially of $R_3SiO_{\frac{1}{2}}$ units and $SiO_{4/2}$ units in the ratio stated above; and
(ii) a polyorganohydrogensiloxane.

R in reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl, or propyl. Most preferably, R is a methyl radical. Minor amounts of vinyl radicals as R radicals are beneficial to enhance reactivity in some cases. Reactant (i) contains from 0.1% to 5% by weight, based on the total weight of reaction (i) of hydroxyl radicals bonded to silicon atoms. Minor proportions of alkoxy radicals are often unintentionally present in organosilicon resins. The presence of such alkoxy radicals in reactant (i) is not thought to have any effect on the ultimate curable silicone compositions.

Preferably, reactant (i) is comprised of 1 to 5 percent by weight of silicon-bonded hydroxyl radicals, based on the total weight of reactant (i).

For the purpose of making Component (A), reactant (i) is furnished dispersed in an appropriate organic solvent. It is advantageous to select an organic solvent which forms an azeotrope with water. Such organic solvents are well known for this purpose, and include, for example, benzene, toluene, xylene, and trichloroethane.

Organosilicon resins as described above for reactant (i), and their synthesis, are described in U.S. Pat. No. 2,676,182, issued Apr. 20, 1954, which patent is incorporated herein by reference to teach a method of synthesis for reactant (i).

To summarize a preferred method of synthesis of reactant (i), the following steps are performed:

1. An aqueous solution of sodium silicate is acidified to a pH value of less than about 5;
2. The resulting mixture is treated with a source of $R_3SiO_{\frac{1}{2}}$ units;
3. The mixture from step 2 is heated, then cooled;
4. The product of step 3 is fractionally extracted with an appropriate, water-immiscible organic solvent. An organosilicon resin suitable for use as reactant (i) becomes isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; a disiloxane of the general formula $(R_3Si)_2O$; or other sources of $R_3SiO_{\frac{1}{2}}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of Component (A) of the compositions of the present invention is a polyorganohydrogensiloxane, as described in U.S. Pat. No. 4,322,518, issued Mar. 30, 1982. By polyorganohydrogensiloxane it is meant herein a liquid polyorganosiloxane containing an average of at least one silicon-bonded H radical per molecule.

Reactant (ii) can have a linear, cyclic, or branched polymeric structure, or appropriate combinations of these structures, provided that said reactant (ii) is a liquid at 25° C. Radicals of reactant (ii) that are not silicon-bonded hydrogen radicals are selected from monovalent hydrocarbon radicals as hereinabove described. A linear polyorganohydrogensiloxane consisting primarily of from 25 to 75 repeat units is a preferred reactant (ii).

Polyorganohydrogensiloxanes suitable for use as reactant (ii) are well known; many are available commercially. Said polyorganohydrogensiloxanes need not be further detailed herein.

Preferably, reactant (i) and reactant (ii) can be reacted together to form Component (A) in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration or organic solvent is less than 4% by weight, based on the total weight of the mixture.

Alternatively, some or all of the organic solvent can be retained along with the reaction product of (i) or (ii).

If reactant (i), as furnished, does not contain from 0.00018 to 0.018 equivalents of acid per gram, it is necessary to add the amount required to provide 0.0018 equivalents per gram, of a strong acid, such as HCl, to the reaction mixture.

The relative amounts of reactant (i) and reactant (ii) that are used are not overly critical. Generally, from 10 to 90 parts by weight of reactant (i) are reacted with 90 to 10 parts by weight of reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of Component (A).

Component (B) of the compositions of the present invention is an organosilicon polymer having the general formula

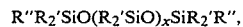

$$R''R_2'SiO(R_2'SiO)_xSiR_2'R'',$$

wherein each R' is selected from the group consisting of monovalent hydrocarbon radicals, each R'' is selected from the group consisting of OH radicals and R' radicals, x has a value of from 0 to 5000, there being on average, at least two radicals of said organosilicon polymer selected from the group consisting of vinyl radicals and hydroxyl radicals.

By monovalent hydrocarbon radical it is meant a monovalent radical composed solely of hydrogen atoms and carbon atoms.

Thus R' can be an alkyl radical, such as methyl, ethyl, propyl, butyl and the like; a cycloalkyl radical, such as cyclopentyl, cyclohexyl, cycloheptyl and the like; and aryl radical such as phenyl, naphthyl and the like; and alkaryl radical, such as tolyl, xylyl, mesityl and the like; an aralkyl radical, such as beta-phenylethyl, beta-phenylpropyl, and the like; or an alkenyl radical such as vinyl, allyl, cyclopentenyl, cyclopentadienyl and the like.

Organosilicon polymers of this description are well known; many are commercially available. The synthesis of other suitable organosilicon polymers from more basic starting materials is also well known. For example, suitable organosilicon polymers can be made by base catalyzed ring-opening polymerization of mixtures of suitable cyclosiloxanes and $R''R_2'SiO_{\frac{1}{2}}$ sources. Examples of $R''R_2'SiO_{\frac{1}{2}}$ sources include $R''R_2'SiCl$, $R''R_2'SiOH$, $R''R_2'SiOC_2H_5$, $(R''R_2'Si)_2O$ and others.

The value of x in the general formula for organosilicon polymer Component (B), is from 0 to 5000. Thus, Component (B) can range from a thin fluid to a highly viscous gum. More preferably, x has a value of from 50 to 2000.

Specific examples or organosilicon polymers suitable for use as Component (B) include, but are not limited to:
$Me_3SiO(Me_2SiO)_{2500}(MeViSiO)_2SiMe_3$;
$Me_2ViSiO(Me_2SiO)_{880}SiMe_2Vi$;
$Mo(Me_2SiO)_{4900}H$;
$C_6H_5Me_2SiO(C_6H_5ViSiO)_{12}(Me_2SiO)_{88}SiMe_2C_6H_5$;
$Me_2ViSiOSiMe_2Vi$;
and others. Organosilicon polymers in which most of the R' radicals are methyl radicals are preferred.

Minor amounts of $R'SiO_{3/2}$ units, or branch points, are incidental to the commercial production of organosilicon polymers and are not known to have any significant effect on the present invention.

Two or more organosilicon polymers can be used as Component (B) in the compositions of the present invention, so long as each of them falls within the definition of Component (B) given above.

Component (C) of the compositions of the present invention is an organosilicon resin consisting essentially of $Me_2ViSiO_{\frac{1}{2}}$ units, $Me_3SiO_{\frac{1}{2}}$ units, and $SiO_{4/2}$ units, said units being in a weight ratio of $Me_2ViSiO_{\frac{1}{2}}/Me_3SiO_{\frac{1}{2}}/SiO_{4/2}$ units of from 0.10/0.6/1 to 0.25/0.9/1.

Organosilicon resins suitable for use as Component (C) can be synthesized by following the general procedure for synthesizing reactant (i) above, with appropriate modification. For example, Component (C) can be synthesized by:

1. acidifying an aqueous solution of sodium silicate to a pH value of less than about 5;
2. treating the resulting mixture with a source of $Me_3SiO_{\frac{1}{2}}$ units;
3. treating the resulting mixture with a source of $Me_2ViSiO_{\frac{1}{2}}$ units;
4. heating, then cooling the product;
5. fractionally extracting the product of step 4 in an appropriate water-immiscible solvent.

Step 3 can be performed before Step 2, simultaneously with Step 2, immediately following Step 2, or after Step 5 in alternative procedures.

Examples of $Me_3SiO_{\frac{1}{2}}$ sources include compounds having the general formula $Me_3SiX$, where X is a hydrolyzable radical, such as a halogen or alkoxy radical; the compound $(Me_3Si)_2O$; and other $Me_3SiO_{\frac{1}{2}}$ sources.

Examples of $Me_2ViSiO_{\frac{1}{2}}$ sources include compounds having the general formula $Me_2ViSiX$, where X is a hydrolyzable radical as described above; the compound $(Me_2ViSi)_2O$; and other $Me_2ViSiO_{\frac{1}{2}}$ sources.

Component (C) is preferably furnished in a water-immiscible organic solvent. Especially preferred organic solvents for the purposes of the present invention are xylene, toluene, and mixtures of xylene and toluene.

Component (D) of the compositions of the present invention is one or more hydrosilylation catalyst.

Hydrosilylation catalysts, that is catalysts for the general reaction $\equiv SiH + CH_2CH \longrightarrow SiCH_2CH_2 -$, are well known. Examples of hydrosilylation catalysts are complexes and salts of certain metals, such as Pt, Pd, Ni, Ru, Rh, Cu, Os, and Ir. Preferred hydrosilylation catalysts for use as Component (D) are salts and complexes of said metals that are soluble in Component (B) of the compositions of the present invention. Especially preferred are complexes of Pt that are soluble in Component (B), such as the complex formed by the addition of chloroplatinic acid to tetramethyldivinyldisiloxane. Hydrosilylation catalysts are well known and readily available.

The parts by weight of the hydrosilylation catalyst to be used in the compositions of the present invention are to be calculated on the basis of the weight of the metal in the salt or complex.

Thus, for example, if one wishes to add 0.001 parts of platinum catalyst, which platinum catalyst is supplied as a complex of platinum consisting of 10% platinum by weight, one would add 0.010 parts of the complex.

In addition to Components (A), (B), (C), and (D), the compositions of the present invention can also contain optional ingredients. Examples of such optional ingredients include fillers, such as amorphous silica, titania, alumina, alumina hydrates, diatomaceous earth, metal oxides, finely divided metals and plastics, glass, such as fiberglass, and the like; cure inhibitors, such as certain acetylene derivatives well known as hydrosilylation reaction inhibitors, such as methyl butynol; cure promoters, such as cyclosiloxanes containing (MeViSiO) units, the compound $(Me_2HSi)_2O$ and the like; organic dyes; pigments; fungistats; bacteriostats; solvents, such as toluene, xylene, mineral spirits, mixtures of solvents, and the like; and other optional ingredients.

Of course, any optional ingredient known to adversely affect the properties of the cured composition, or subsequently discovered to have such an adverse effect, should be avoided.

The compositions of the present invention comprise:
from 1 to 200 parts by weight of Component (A);
100 parts by weight of Component (B);
from 1 to 50 parts by weight of Component (C); and
from 0.00003 to 0.035 parts by weight of Component (D).

More preferably, the compositions of the present invention comprise:
from 5 to 100 parts by weight of Component (A),
100 parts by weight of Component (B);
from 5 to 25 parts by weight of Component (C); and
from 0.00014 to 0.025 parts by weight of Component (D).

Most preferably, the compositions of the present invention comprise:
from 10 to 60 parts by weight of Component (A), 100 parts by weight of Component (B);
from 10 to 25 parts by weight of Component (C); and
from 0.0014 to 0.025 parts by weight of Component (D).

The four components are combined by mixing the four components together, along with any optional ingredients.

Mixing can be accomplished by any reasonable mixing means. For example, the components can be mixed by hand, as with a stirrer; in a vessel equipped with a mechanically driven stirrer; in such mixing equipment as Baker-Perkins® mixers, three roll mills, two roll mills, and other known types of mixers.

In some cases it may be beneficial to provide the compositions of the present invention in two parts. The two parts can be mixed together to provide a composition of the present invention. For example, Component (A) can constitute a first part, and a mixture of Components (B), (C), and (D) can constitute a second part. Alternatively, a mixture of Components (A), (B), and (C) can constitute a first part and Component (D) a second part.

Provision of compositions in two parts as described above is a well known practice. Such provision improves storage stability, i.e. maximizes the amount of time a composition can be stored before chemical reaction of the components with one another cause it to become unusable.

The compositions of the present invention are generally used as coatings, i.e. applied as a thin film onto a substrate. Examples of appropriate substrates include mineral substrates, such as stone, cement, brick, porcelain, ceramic, glass fiber, and glass; metal substrates, such as steel, aluminum, titanium and the like; cellulosic substrates, such as paper, cotton, wood, cardboard and the like; proteinaceous substrates, such as human skin and hair, the fur of animals and the like; plastic substrates, such as polyolefins such as polyethylene and polypropylene, polyesters such as polyethylene terephthalate and polybutylene terephthalate; rubber substrates, such as silicone rubber, butyl rubber, natural rubber, ethylene-propylene rubber, and the like; and other substrates. Cured compositions of the present invention have been found to confer excellent corrosion protection to steel and aluminum substrates upon which they have been coated and cured.

The compositions of the present invention have excellent adhesion to substrates. For that reason, they can also be used as an adhesive which bonds the same or different substrates together, thus forming a laminate.

Application of the compositions of the present invention to a substrate can be accomplished by any appropriate technique. Selection of a particular application technique will be generally dependent on the viscosity of the composition. Thus, a composition of the present invention having a viscosity less than, e.g. 100 centistokes at 25° C. can be sprayed, via spray gun or aerosol; a composition having a viscosity between, e.g. 100 centistokes and 25,000 centistokes at room temperature can be doctored onto a substrate; and a composition having a viscosity greater than e.g. 25,000 centistokes can be calendared onto a substrate.

Compositions of the present invention having suitable viscosities can also be fabricated as articles per se, by such well known techniques as compression molding, transfer molding, injection molding, or extrusion.

The compositions of the present invention can be cured by exposing them to sufficient amounts of heat. By the term cured it is meant rendered insoluble in a solvent that readily dissolves the fresh, uncured mixture of the four components. Toluene, xylene, and mixtures of toluene and xylene are good solvents for uncured compositions of the present invention.

Sufficient amounts of heat to render the compositions cured can be attained by exposing them to elevated temperatures, such as 35° C. to 250° C. for a period of time ranging from 2 or 3 hours to 5 seconds or so. Sufficient times of exposure at a given elevated temperature are readily determined experimentally.

Alternatively, some of the compositions of the present invention can be cured by exposure to ambient temperatures for longer periods of time, e.g. 2 or 3 days.

The compositions of the present invention have been found to provide excellent elastomeric materials of high strength and solvent resistance. Moreover, the compositions of the present invention have been found to provide excellent protection to steel, porcelain, and aluminum substrates when coated and cured upon those particular substrates.

The following Examples are presented to further illustrate the invention. Parts and percentages in the Examples are by weight unless otherwise specified.

The following tests were used to evaluate cured compositions of the present invention:

Fuel Resistance Test—Solvent resistance was tested for by the general procedure set forth in American Society for Testing and Materials, (ASTM), standard D-471. Samples were immersed in jet fuel (JP-4), at 160° F., for 72 hours, except where other temperatures are specified. Physical properties were determined and recorded before immersion, and after the samples had been dried for 48 hours at 140° F. Volume swell and weight gain values reported were measured before the samples were dried.

Peel Adhesion: The adhesion of cured compositions of the present invention were tested according to the general procedure of ASTM Standard D903. A sample was applied to, and cured upon a clean aluminum panel, then peeled from the panel at an angle of 180°. The force required to remove the sample was recorded, and converted to pounds of force per linear inch of bond.

Tear Strength: Tear strength values reported herein were determined by the general procedure described in ASTM Standard D624-die B tear.

Tensile Strength and Elongation: Tensile strength and elongation values reported herein were measured by the general procedure set forth in ASTM Standard D412.

Durometer, Shore A: Durometer, a measure of the indentation hardness of a material, was measured by the general procedure of ASTM Standard D2240.

Lap Shear Adhesion: Lap shear adhesion was measured by the general procedure of ASTM Standard D816. Two panels were bonded together by about 0.020 inches of the material under test. The panels and material under test were then cured. Values for adhesion were determined from the force required to separate the panels while pulling the panels in such a manner that they remained parallel to one another. The material joining the panels was thus sheared rather than extended. Note was also taken as to the mode of failure. A failure mode of adhesive failure indicates that failure was in the bond between a panel and the material under test. A failure mode of cohesive failure indicates that the failure was within the material under test. Cohesive failure indicates a high adhesion between the material under test and the panel and is preferred in most cases.

EXAMPLE 1

Synthesis of Component (A)

A mixture was charged to a vessel provided with a stirrer. The mixture consisted of:
 (i) 41.2 parts of an organosilicon resin composed of $Me_3SiO_{\frac{1}{2}}$ units and $SiO_{4/2}$ units in the ratio of 0.6 $Me_3SiO_{\frac{1}{2}}$ units to 1 $SiO_{4/2}$ unit;
 (ii) 41.2 parts of a polymer having the average formula $$Me_3SiO(MeHSiO)_{35}SiMe_3;$$

and 17.6 parts of xylene.

This mixture, with continuous stirring, was heated to a temperature of 150° C. The pressure in the vessel was gradually reduced to a value between 40 mm and 50 mm Hg. Heating under reduced pressure was continued for approximately 2 hours. During this time, volatilized xylene was removed and condensed in a reservoir separate from the vessel containing the mixture. After 2 hours, the reaction product was recovered. It was a substantially solvent free liquid organosilicon resin as described hereinabove as Component (A) of the compositions of the present invention.

Preparation of a Composition of the Present Invention

A first mixture was made by stirring together the following components:
 Component (A): 54.7 parts of the liquid organosilicon resin described above;
 Component (B): 100 parts of a siloxane polymer having the average formula $$Me_2ViSiO(Me_2SiO)_{880}SiMe_2Vi;$$

Component (C): 23.3 parts of a silicone resin composed of $Me_2ViSiO_{\frac{1}{2}}$ units, $Me_3SiO_{\frac{1}{2}}$ units and $SiO_{4/2}$ units in the ratio 0.15/0.6/1; and
 Optional ingredients:
  0.87 parts of methyl butynol;
  0.29 parts of $(Me_2HSi)_2O$;
  14.5 parts of xylene.

To this first mixture was added a quantity of a platinum-vinylsiloxane complex containing 0.7% platinum, such that 0.01 parts of platinum were mixed with the first mixture.

This second mixture, which resulted from adding Component (D), the 0.01 parts of platinum, to the previously prepared mixture, was cured by compression molding for 10 minutes at a temperature of 280° F.

The cured sample had the following physical properties:
  durometer: 85
  tensile strength: 940 pounds per square inch
  elongation: 105%
  tear strength: 110 pounds per inch These properties were surprisingly good, in view of a previous experiment conducted under the same conditions, but with no Component (C) present. Cured properties of this comparison composition were:
  durometer: 45
  tensile strength: 275 pounds per square inch
  elongation: 113%
  tear strength: 31 pounds per inch Samples of the cured compositions of this Example were tested by the Fuel Resistance Test.

The samples swelled 56.1% by volume, and gained 41.3% by weight after immersion in JP-4 jet fuel for 72 hours at 160° F.

A sample, which had been immersed in the jet fuel, was then dried at 140° F. for 48 hours. The following properties were determined:
  durometer: 84
  tensile strength: 931 pounds per square inch
  elongation: 105%

Note that there was little or no diminution of physical strength when the cured composition of Example 1 was exposed to the JP-4 jet fuel.

In contrast, when the comparison composition referred to above was immersed in the JP-4 jet fuel for 72 hours, at a temperature of 175° F., it swelled 264% by volume and gained 193% by weight. The difference in test temperature between the Example and the comparison composition is not thought to be significant.

EXAMPLE 2

The procedure and amounts of Example 1 were repeated. Properties were found to be:
  durometer: 80
  tensile strength: 822 pounds per square inch
  elongation: 109%

Part of the composition was applied to a clean, dry, aluminum panel and cured for 48 hours at 25° C., followed by 5 minutes at 150° C. The peel adhesion value was found to be 47 pounds.

EXAMPLE 3

The procedure of Example 1 was repeated for the following components:
  Component (A) of Example 1: 56.2 parts
  Component (B) of Example 1: 100 parts
  Component (C) of Example 1: 20.8 parts
  Component (D) of Example 1: 0.025 parts
  xylene: 12.4 parts
  methyl butynol: 0.86 parts
  $(Me_2HSi)_2O$: 0.28 parts The composition of Example 3 was coated upon various substrates with a drawdown bar, cured at 25° C. for 72 hours, then 150° C. for 5 minutes, and tested for lap shear adhesion. Results are in Table 1.

TABLE 1

| Substrate | Lap Shear Adhesion | |
|---|---|---|
| | Lap shear value (pounds/inch) | type of failure |
| aluminum | 280 | cohesive |
| steel | 289 | cohesive |
| galvanized steel | 177 | cohesive |

That which is claimed is:

1. A composition comprising in combination,
 (A) from 1 to 200 parts by weight of the reaction product of
  (i) an organosilicon resin consisting essentially of $R_3SiO_{\frac{1}{2}}$ units and $SiO_{4/2}$ units wherein R represents a monovalent hydrocarbon radical and the ratio of $R_3SiO_{178}$ units to $SiO_{4/2}$ units is from 0.6/1 to 0.9/1 and
  (ii) a polyorganohydrogensiloxane;
 (B) 100 parts by weight of an organosilicon polymer having the formula $R''R_2'SiO(R_2'SiO)_xSiR_2'R''$, wherein each R' is selected from the group consisting of monovalent hydrocarbon radicals, each R'' is selected from the group consisting of OH radicals and R' radicals, x has a value of from 0 to 5000, there being on average at least two radicals of said organosilicon polymer selected from the group consisting of vinyl radicals and hydroxyl radicals;
 (C) from 1 to 50 parts by weight of an organosilicon resin consisting essentially of $(CH_3)_2(CH_2=CH)SiO_{\frac{1}{2}}$ units, $(CH_3)_3SiO_{178}$ units and $SiO_{4/2}$ units, said units being in a ratio of $(CH_3)_2(CH_2=CH)SiO_{\frac{1}{2}}$ units to $(CH_3)_3SiO_{\frac{1}{2}}$ units to $SiO_{4/2}$ units of from 0.10/0.6/1 to 0.25/0.9/1; and
 (D) from 0.00003 to 0.035 parts by weight of a hydrosilylation catalyst, said parts being by weight of the metal in the catalyst.

2. A composition as claimed in claim 1 wherein R is the methyl radical, R' is selected from the group consisting of methyl radicals and vinyl radicals, R'' is selected from the group consisting of methyl radicals and vinyl radicals, and x has a value of from 50 to 2000.

3. A composition as claimed in claim 2 further comprising a filler.

4. A composition as claimed in claim 3 wherein the filler is alumina.

5. A composition as claimed in claim 2 further comprising a solvent.

6. A composition as claimed in claim 5 wherein the solvent is xylene.

7. A composition as claimed in claim 2 further comprising a cure promoter.

8. A composition as claimed in claim 7 wherein the cure promoter is a cyclosiloxane containing $(CH_3)(CH_2=CH)SiO$ units.

9. A composition as claimed in claim 7 wherein the cure promoter is $((CH_3)_2HSi)_2O$.

10. A composition as claimed in claim 2 further comprising a hydrosilylation inhibitor.

11. A composition as claimed in claim 10 wherein the hydrosilylation inhibitor is methyl butynol.

12. A composition as claimed in claim 2 comprising from 5 to 100 parts by weight of Component (A); 100 parts of Component (B); from 5 to 25 parts by weight of Component (C); and from 0.00014 to 0.025 parts by weight of Component (D).

13. A composition as claimed in claim 12 further comprising a filler.

14. A composition as claimed in claim 13 wherein the filler is alumina.

15. A composition as claimed in claim 12 further comprising a solvent.

16. A composition as claimed in claim 15 wherein the solvent is xylene.

17. A composition as claimed in claim 12 further comprising a cure promoter.

18. A composition as claimed in claim 17 wherein the cure promoter is a cyclosiloxane containing $(CH_3)(CH_2=CH)SiO$ units.

19. A composition as claimed in claim 17 wherein the cure promoter is $((CH_3)_2HSi)_2O$.

20. A composition as claimed in claim 12 further comprising a hydrosilylation inhibitor.

21. A composition as claimed in claim 20 wherein the hydrosilylation inhibitor is methyl butynol.

22. A composition as claimed in claim 12 comprising
from 10 to 60 parts by weight of Component (A);
100 parts by weight of Component (B);
from 10 to 25 parts by weight of Component (C); and
from 0.0014 to 0.025 parts by weight of Component (D).

23. A composition as claimed in claim 22 further comprising a filler.

24. A composition as claimed in claim 23 wherein the filler is alumina.

25. A composition as claimed in claim 22 further comprising a solvent.

26. A composition as claimed in claim 25 wherein the solvent is xylene.

27. A composition as claimed in claim 22 further comprising a cure promoter.

28. A composition as claimed in claim 27 wherein the cure promoter is a cyclosiloxane containing $(CH_3)(CH_2=CH)SiO$ units.

29. A composition as claimed in claim 27 wherein the cure promoter is $((CH_3)_2HSi)_2O$.

30. A composition as claimed in claim 22 further comprising a hydrosilylation inhibitor.

31. A composition as claimed in claim 30 wherein the hydrosilylation inhibitor is methyl butynol.

32. A composition as claimed in claim 31 further comprising $((CH_3)_2HSi)_2O$, xylene, and alumina.

33. An article comprising the composition of claim 1 bonded to a substrate.

34. An article as claimed in claim 33 wherein the substrate is steel.

35. An article as claimed in claim 33 wherein the substrate is aluminum.

36. An article as claimed in claim 33 wherein the substrate is porcelain.

37. An article comprising the composition of claim 12 bonded to a substrate.

38. An article as claimed in claim 37 wherein the substrate is steel.

39. An article as claimed in claim 37 wherein the substrate is aluminum.

40. An article as claimed in claim 37 wherein the substrate is porcelain.

41. An article comprising the composition of claim 22 bonded to a substrate.

42. An article as claimed in claim 41 wherein the substrate is steel.

43. An article as claimed in claim 41 wherein the substrate is aluminum.

44. An article as claimed in claim 41 wherein the substrate is porcelain.

45. An article comprising the composition of claim 32 bonded to a substrate.

46. An article as claimed in claim 45 wherein the substrate is steel.

47. An article as claimed in claim 45 wherein the substrate is aluminum.

48. An article as claimed in claim 45 wherein the substrate is porcelain.

* * * * *

UNITED STATES PATENT AND TRADEMARK OFFICE
CERTIFICATE OF CORRECTION

PATENT NO. : 4,537,829

DATED : August 27, 1985

INVENTOR(S) : John D. Blizzard

It is certified that error appears in the above-identified patent and that said Letters Patent is hereby corrected as shown below:

In col. 1, line 65, the word "each" should come before "R'".

In col. 1, line 68, the word "an" should read --on--.

In col. 2, line 49, the word "reaction" should read --reactant--.

In col. 4, line 51, the formula "$Mo(Me_2SiO)_{4900}H$" should read --$HO(Me_2SiO)_{4900}H$--.

In col. 5, line 33, the formula "$\equiv SiH + CH_2CH \rightarrow SiCH_2CH_2-$" should read -- $\equiv SiH + CH_2=CH \rightarrow SiCH_2CH_2-$ --.

In col. 10, line 16, the formula "$R_3SiO_{178}$" should read --$R_3SiO_{1/2}$--.

In col. 10, line 31, the formula "$(CH_3)_3SiO_{178}$" should read --$(CH_3)_3SiO_{1/2}$--.

Signed and Sealed this

Twelfth Day of August 1986

[SEAL]

Attest:

Attesting Officer

DONALD J. QUIGG

Commissioner of Patents and Trademarks